Nov. 28, 1967  A. I. McFARLAN  3,354,943
AIR CONDITIONING SYSTEM
Filed March 11, 1965  5 Sheets-Sheet 1

INVENTOR.
ALDEN I. McFARLAN
BY
Curtis, Morris + Safford
ATTORNEYS

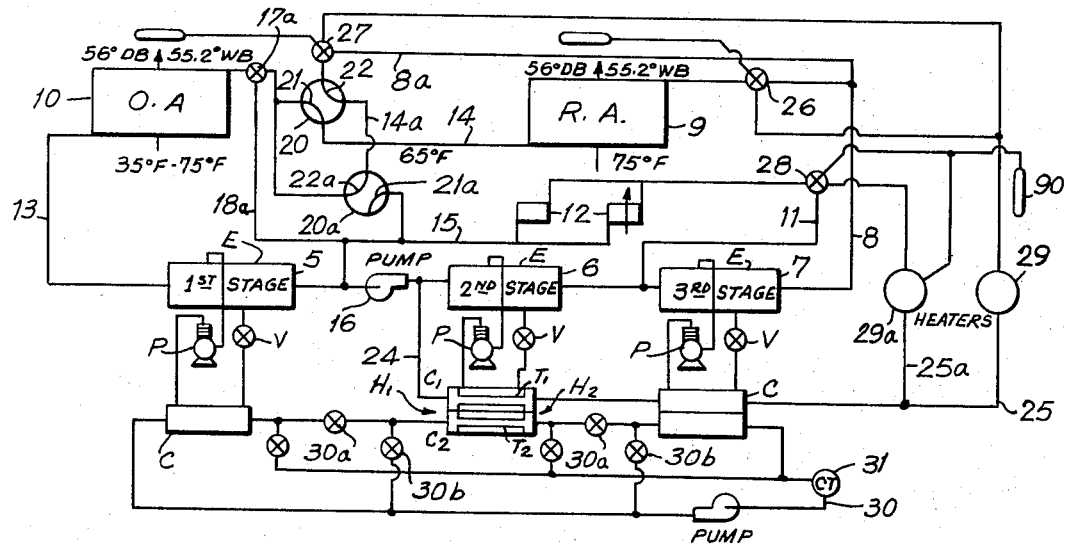
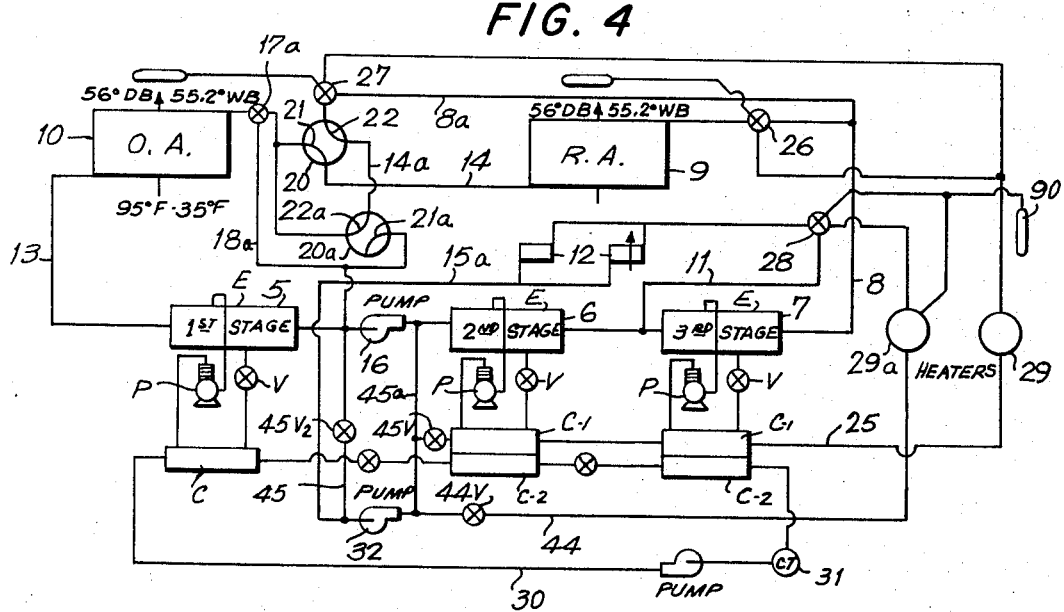

Nov. 28, 1967   A. I. McFARLAN   3,354,943
AIR CONDITIONING SYSTEM
Filed March 11, 1965   5 Sheets-Sheet 4
FIG. 7
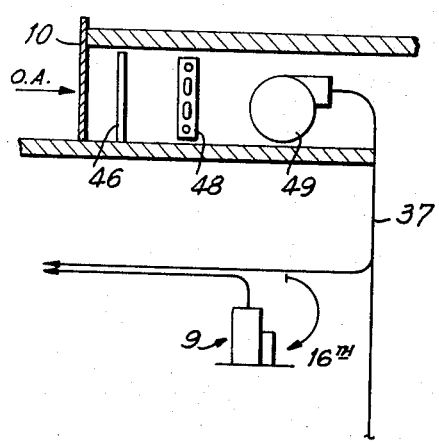
FIG. 8
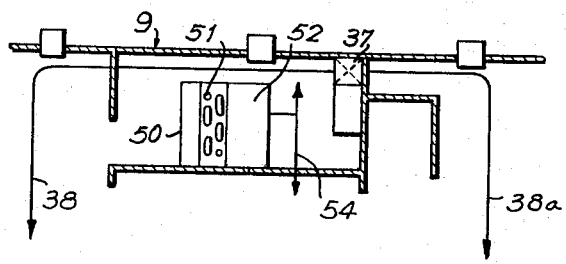
FIG. 9   FIG. 10
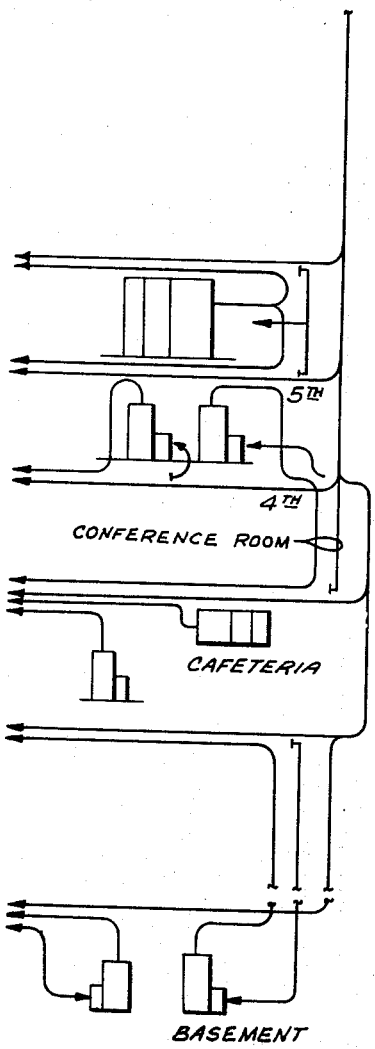
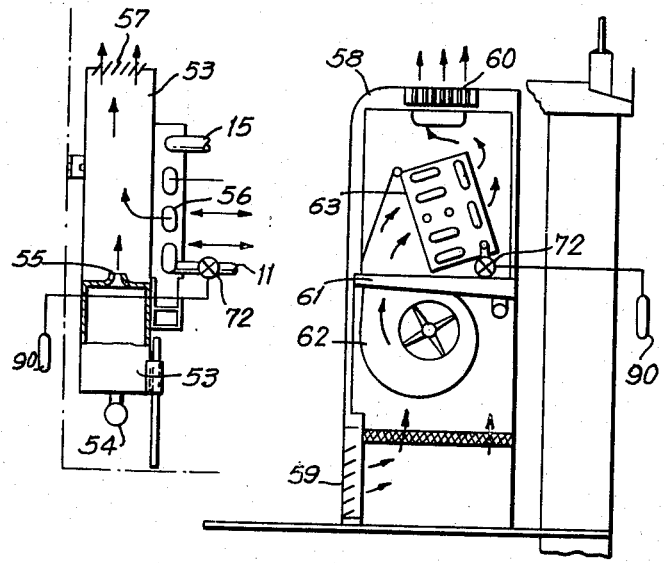
FIG. 11
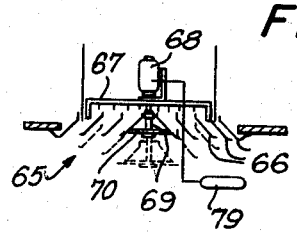
INVENTOR
ALDEN I. McFARLAN
BY
Curtis, Morris & Safford
ATTORNEYS Nov. 28, 1967   A. I. McFARLAN   3,354,943
AIR CONDITIONING SYSTEM
Filed March 11, 1965

INVENTOR.
ALDEN I. McFARLAN
BY
Curtis, Morris & Safford
ATTORNEYS

United States Patent Office 3,354,943
Patented Nov. 28, 1967

3,354,943
AIR CONDITIONING SYSTEM
Alden I. McFarlan, 691 Dorian Road,
Westfield, N.J. 07090
Filed Mar. 11, 1965, Ser. No. 438,891
21 Claims. (Cl. 165—2)

ABSTRACT OF THE DISCLOSURE

The invention relates to an air conditioning system utilizing a "heat balance" concept. Heated or cooled air is supplied to the periphery of the building to balance the heat transmitted through the walls by conduction while a separate stream of cooled air is delivered to the interior of the space to balance the heat generated in said space and the heat from the interior is used to heat the peripheral areas on heating. Preferably, the temperature of the air supplied to the periphery is varied to compensate for conduction through the walls and the volume of cooled air supplied to the interior of the space at a predetermined constant temperature is varied.

---

The present invention relates to air conditioning and more particularly to an improved method of and system for air conditioning large buildings.

In modern building, such as large office structures, the interior of the building usually requires cooling the year around while the periphery of the building may require cooling during the summer, heating during the winter and selective heating or cooling at any particular time during the spring and fall. In additon, the building is subjected to a sun load which has become a large factor in the more modern buildings which use large areas of glass in the walls. Furthermore, the sun load changes from one side of the building to the other during the day so that in the morning a particular side of the building may require cooling while in the afternoon it may require heating to maintain comfort conditions. In an overall heat balance, however, the heat produced at the interior of the building by lights, appliances, and the presence of people, and the like, is sufficient to meet the requirements for heating the entire building down to an outside ambient temperature of, for example 35° F. Therefore, sufficient heat is generated in the building to provide for its heating requirements for most operating conditions during the year if such heat could be used and to supply at least part of the heat required when it is necessary to add heat from conventional sources.

However, conventional air conditioning systems for such buildings have an air cooling unit for cooling the interior or core of the building and peripheral air treating units to take care of the heating and cooling requirements at the periphery of the space including the sun load, heat generated in the space and heat transmitted through the walls. The peripheral air treating units are controlled by thermostats which are frequently set individually by different persons in different areas of the space to maintain comfort conditions in each area influenced by the particular unit. Therefore, the peripheral air treating units must be of a size to take care of peak local load conditions in addition to the central system which supplies conditioned air to the core of the building. As a result, such conventional systems usually have a central air treating unit operating on a cooling cycle to cool the interior of space when the peripheral treating units are on a heating cycle; or certain of the peripheral air treating units may be operating to cool certain areas due to local sun effect, while other of the peripheral units may be operating to heat other areas depending upon the particular setting of the thermostatic control for the individual units; or the peripheral units on one side of the building may be heating while the peripheral units on another side of the building are cooling. Thus, the central air treating units operate on a cooling cycle from one source of energy to cool the interior of the building while at the same time the peripheral units operate on a heating cycle from another source of energy to heat the periphery of the building so that heat is being removed from one portion of the building at the same time that heat is being supplied to another portion of the building.

One of the objects of the present invention is to provide an improved method of and system for air conditioning a building in which the peripheral air treating units all operate simultaneously on heating or cooling to balance only the heat transmission through the walls and/or roof of the building.

Another object is to balance the heat transmitted through the walls and roof of the building at its periphery so that the entire remaining load is a cooling load.

Another object is to utilize the heat occurring in the interior of the building to heat the peripheral space of the building when heat is required.

Another object is to utilize heat occurring in the building for heating outside air as it enters the building to a controlled temperature sufficiently below the room temperature to produce comfort conditions therein and then introducing the partially heated outside air into the interior of the building to cool the space.

Another object is to utilize the inside space being conditioned as a plenum for mixing conditioned outside air and conditioned return air supplied thereto in separate streams at the required temperature and relative humidity.

Another object is to vary the volume of air supplied to different areas of the building in accordance with the inside temperature to balance any variable heat load except that transmitted through the walls and roof.

Still another object of the invention is to provide an improved system for air conditioning a building which is of simple and compact construction, reduces the size of the refrigeration and air treating units, reduces the space required for ducts, conduits and auxiliary equipment to produce comfort conditions and is more economical to install and operate than conventional air conditioning systems.

These and other objects will become more apparent from the following description and drawings in which like reference characters denote like parts throughout the several views. It is to be expressly understood, however, that the drawings are for the purpose of illustration only and are not a definition of the limits of the invention, reference being had for this purpose to the appended claims.

In the drawings:

FIGURE 3 is a view like FIGURE 2 showing the arrangement of the water circuit for winter operation at outside temperatures between 75° F. and 35° F.;

FIGURE 4 is a diagrammatic view of a modified circuit similar to that illustrated in FIGURES 2 and 3 to adapt it for heating to low temperature climates;

FIGURE 7 is an elevational view of a portion of a building partly in section showing outside air being supplied from air treating units on the roof and in the basement through vertical ducts, and different arrangement on different floors for different conditions;

FIGURE 8 is a detail plan view partly in section showing a high pressure air treating unit for supplying primary air when induction units or any other type of unit is used requiring primary air;

FIGURE 9 is an elevational view partly in section of an air induction window unit for treating air at the periphery of the space;

FIGURE 10 is an elevational view partly in section of a fan coil unit which may be used at the periphery of the building;

FIGURE 11 is an elevational view partly in section of a cooling outlet for varying the volume of the air delivered to the space;

Figure 5:
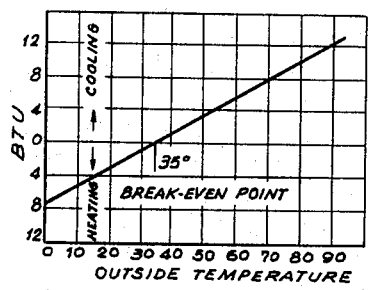
FIGURE 5 is a chart showing the heating and cooling requirements of a typical modern building at varying outside temperatures and a break-even point at 35° F. where the heat produced at the interior of the building balances the heat leakage from the building.

The method of the present invention is based on the fact that sufficient heat is generated within a modern building to supply all of the heat required down to some particular low outside temperature. The particular temperature at which the heat generated will balance the heat required varies with variations of internal load such as lights, people, etc., and sun effect. The chart in FIGURE 5 shows the results of calculating the load conditions in a particular building in which outside temperatures are plotted against B.t.u. units and illustrates a break-even point of at 35° F. at which the heat normally occurring in the building equals the heat loss. The diagonal line of the chart shows the number of B.t.u. units which must be removed or added, as measured vertically between it and a horizontal line through the break-even point, to maintain comfort conditions in the building for any particular outside temperature. Theoretically, therefore, cooling is required down to an outside temperature of 35° F. and no heat need be added to the overall building until this temperature is reached. On the other hand, no cooling need be added to the overall building below 35° F., but additional heat is required.

The heat occurring in any particular area of the building results from heat leakage through the walls of the building, known as transmission heat, heat generated in the space by lights, appliances, people and the like located in the space and by absorption of the sun's rays and known as radiation. The gain or loss of heat by transmission through the walls has a fixed value which is directly proportional to the difference in temperature between the inside and outside of the building. Thus, the heat generated in the building varies with the source such as the number of people, appliances, lights and the like which are present or in operation, respectively. Also, the radiation load may vary depending upon whether or not the sun is shining, which side of the building it is shining on and the amount of glass in the building.

In accordance with the method of the present invention the heat load by transmission through the walls is balanced as nearly as possible by peripheral air treating units so that the remaining load is a cooling load. This remaining cooling load is balanced by supplying conditioned air from central air treating units at a temperature below the room temperature the year around. The variations in the generated and/or radiation loads is balanced by varying the volume of conditioned air supplied to the space. The method also utilizes the heat removed from some areas of the building for heating other areas requiring heating in the fall, winter and spring seasons of the year. The method also includes using cold outside fresh air to cool the interior of the space being conditioned to the extent that such outside air is required for ventilation. In addition the method of the present invention contemplates supplying outside fresh air and inside return air directly into the space to be conditioned in separate streams and the space itself is used as a mixing chamber.

For particular circumstances the outside air and recirculated air may be mixed before being supplied to the space being conditioned. However, by supplying the air in separate streams smaller air handling ducts and fan units may be used. Furthermore, the fan used for delivering outside air can do the entire work of delivering the air to the space being conditioned to thereby decrease the size of return unit over that which would be required if it handles both streams.

The peripheral air treating units may be of any suitable type such as air induction units or fan-coil units. The distinguishing feature of these peripheral air treating units in accordance with applicants' method is that they are sized to take care of the maximum heat transmission through the walls of the building only, at the extremes expected at the particular geographic location. As the heat transmission load is directly proportional to the difference in temperature between the inside and outside of the building, the rate of operation of the peripheral air conditioning units is directly controlled in accordance with the outside temperature, as by means of a thermostat in the outside air. This operation and control of the peripheral air treating units reduces the size of the units, the amount of primary air delivered to the units, when induction type units are used, and avoids operation of the peripheral air treating units for both heating and cooling, simultaneously.

The remaining air supplied to the space being conditioned may be either 100% fresh air, or 100% recirculated return air, or from 25% to 75% fresh air to 75% to 25% return air depending upon the requirements of the particular space. For example, in office space 75% return air and 25% fresh air only is required. In a conference room a much higher percentage of fresh air should be used because of the smoke which is apt to be present. In kitchens and restaurants it is desirable to use 100% fresh air. For any area, however, the central air treating units need not be any larger than those previously used as the biggest load is that required to cool the outside air down to a particular temperature to produce the required relative humidity in the space being conditioned. Actually, the peripheral air treating units may be made smaller because they are sized only for the transmission loss rather than also including the peripheral zone internal load in accordance with the method of the present invention.

The conditioned air from the central air treating unit is distributed throughout the space being conditioned by ducts having outlets which vary the volume of air flowing therethrough in areas having variable internal loads. As the internal heat load resulting from heat generated therein and radiation heat absorbed varies the temperature in the space, the outlets are varied to directly control the amount of conditioned air supplied to the space directly in accordance with requirements. This feature of the invention provides a closer temperature control, avoids wasting heat and provides a more efficient and economical operation. A thermostat can be used for each distribution outlet, but the number of thermostats required can be only those that will measure different temperature conditions from people, appliances and sun affects in particular zones. For more complete control each room may have its own thermostat so that different temperatures may be produced within limits under the control of the occupants.

The heat removed from one area of the building is used to heat other areas when heating is required. This may be accomplished by using applicants three pipe system having a chilled water line for supplying chilled water where cooling is required, a hot water line for supplying hot water where heating is required and a common return line. In this system the chilled water line directs water through the evaporator-chiller of one or more refrigeration units, the hot water line directs water through the condenser of one or more of the refrigeration units and the common return line delivers water to both the chilled and hot water lines. Also, the relatively warm water leaving the air treating units for cooling the core of the building may be used to preheat the outside air entering the building as fresh make-up air which, in turn, provides some or all of the cold water for cooling. Preferably, this preheating of the outside air is performed by countercurrent flow so that the water is cooled down to a temperature approaching the outside temperature. This water is then delivered to evaporator-chiller and condenser of one or more refrigeration units for additional cooling or heating. As a typical condition, chilled water may enter a recirculated air treating unit at 45° F. and leave at a temperature of 65° F. The water at 65° F. is then directed in heat transfer relation to outside air entering the building to preheat the air and the water is cooled to, for example, 45° F. The water then flows through the chilled water line back to the air treating unit without requiring any refrigeration.

Outside fresh air preheated to a temperature of, for example, 56° F. by heat exchange with the water leaving the air treating unit is then delivered directly to the interior of the space to be conditioned to cool part of the space. Return air, recirculated from the space through an air treating unit, also is delivered directly into said space, but through a separate recirculating air unit. In this way the space itself acts as a mixing chamber for the conditioned outside fresh air and return air. This step of delivering fresh air and return air to the interior of the space in separate streams reduces the size of the fan and coil equipment required to handle the volume of air as compared with mixing the two streams before distribution. The same end result may be obtained, however, by separate cooling of outside and recirculated air and mixing on the discharge side of the two fans.

Figure 1:
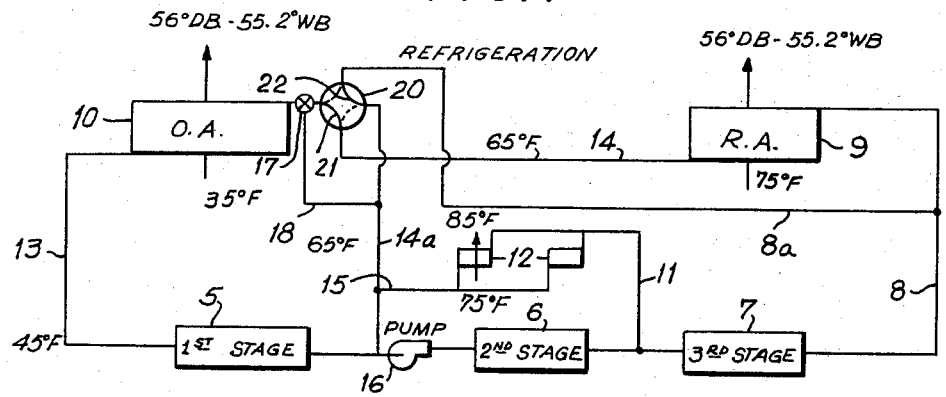
FIGURE 1 is a diagrammatic view of a staged refrigeration system and a chilled water circuit for separately cooling outside air and return air and air circulated by window units during the summer and showing how heat removed from recirculated air may be used to heat outside air and cool return water during the spring, fall and winter months.

Water and air distributing systems are illustrated in the drawings for carrying out the steps of the method. For example, FIGURE 1 illustrates a chilled water circuit for cooling air in a building which may be used independently of or in conjunction with a heating system. This circuit is adapted to cool both outside air and return air in the summer and to cool return air during the winter; and utilizes the heat generated in the space to heat the outside air to the temperature required to cool the space to comfort conditions. The circuit is shown adjusted for winter operation as later explained in detail.

The circuit comprises staged refrigeration units 5, 6 and 7 connected in series and when the passages 21 and 22 of valve 20 are adjusted as shown in dotted lines for summer operation, the units cool water from, for example, 78° F. to progressively lower temperatures of 65° F., 55° F. and 45° F., respectively. A line 8 from the third stage 7 is connected to deliver chilled water to air treating units 9 and 10 for cooling recirculated return air in the enclosure and fresh outside make-up air in separate streams. Each unit 9 and 10 comprises a coil (not shown) through which the chilled water is circulated for cooling air down to a temperature of, for example, 56° F. to produce the desired relative humidity which it is desired to maintain in the space being conditioned. A tap line 11 supplies chilled water from between the stages 6 and 7 to a plurality of peripheral air treating units 12 connected in parallel. These units are adapted to recirculate and cool air from a room temperature of, for example, 75° F. to a temperature of 65° F. Water at a temperature of, for example 78° F. is delivered from the air treating unit 10 through a line 13 to the first stage 5 and the air treating unit 9 is connected through return lines 14 and 14a to a location between the first and second stages of 5 and 6 and having a temperature of, for example, 65° F. The peripheral units 12 are connected to the return line 14a through line 15 for mixture with the water from the air treating unit 9. A single pump 16 is shown in the circuit between the first and second stages for circulating water through the three refrigeration stages 5, 6 and 7 and the air treating units 9, 10 and 12.

In accordance with the present invention the water returning from the air treating unit 9 after cooling the interior of the building is used during operation in the winter to heat outside air entering the building through the air treating unit 10. To this end a valve 20 is provided in the lines 8a and 14 and having ports 21 and 22 for delivering the water from the unit 9 either back to the pump 16 or directly to the air treating unit 10. Thus, when the ports 21 and 22 of the valve 20 are in the position illustrated in full lines in FIGURE 1, the chilled water first flows through unit 9 then passes through line 14 passage 21 of the valve 20, unit 10 and line 13 back to pump 16. Under these conditions of operation during the fall, spring and winter months, water may be returned to the refrigeration units at a low enough temperature so that a fraction only of normal cooling, or no further cooling need be performed on the water and at which time some or all three refrigeration stages stop operation. For example, at an outside temperature of 35° F. water will be supplied through line 8 to the return air unit 9 at 45° F. to cool return air from 75° F. to 56° F. as previously described for cooling in the summer. The water leaving the unit 9 at 65° F. is then directed by the valve 20 through passage 21 into the unit 10. In passing through the heat transfer coil in unit 10 the temperature of the outside air entering the building is raised from 35° F. to a temperature approaching the desired 56° F. and the water leaving the unit is cooled from 65° F. to a temperature approaching 45°. F. The chilled water is then passed through the three stages 5, 6 and 7 without any additional cooling back to the return air unit 9. For producing the desired air temperatures from units 9 and 10 at outside temperatures between 35° F. and 75° F. suitable controls would be provided. For example, a thermostatic valve 17 is illustrated between valve 20 and unit 10 which is operable responsive to the temperature of air from unit 10 to regulate the rate of flow through the unit and a bypass 18 back to pump 16, respectively.

Figure 2:
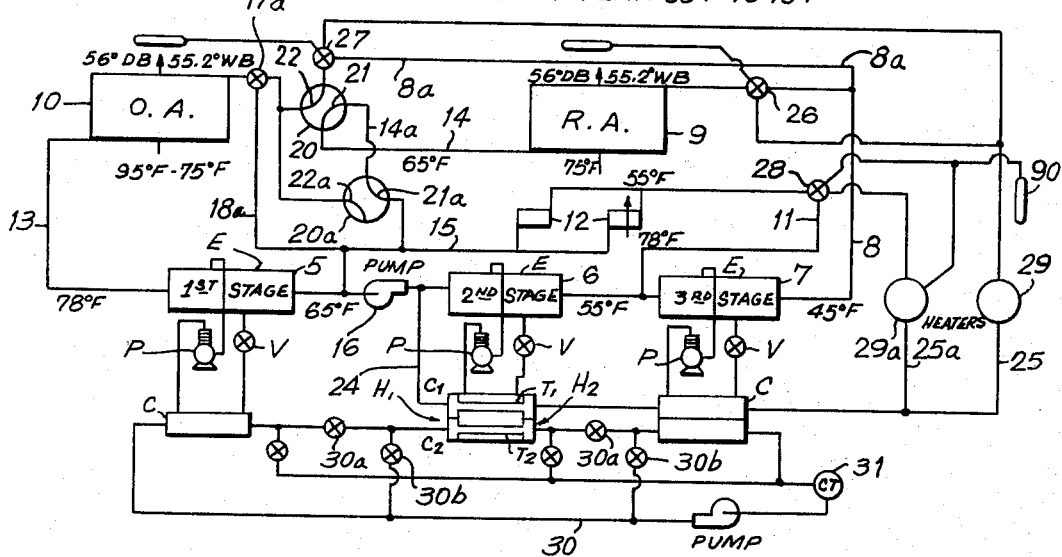
FIGURE 2 is a diagrammatic view similar to FIGURE 1 but showing the water circuit for the three pipe system for summer operation at outside temperatures between 95° F. and 75° F.

FIGURES 2 and 3 show a water circuit generally similar to that shown in FIGURE 1 except that it is applied to applicants three pipe system described and claimed in his United States Letters Patent No. 2,796,740 issued June 25, 1957. This system includes the staged refrigeration units 5, 6 and 7, the air treating units 9, 10 and 12 for treating return air and outside fresh air, the lines 8, 8a and 11 for supplying water to the air treating units, a pump 16 for circulating water in the circuit and valve 20 with valve ports 21 and 22 the same as described with respect to FIGURE 1. FIGURES 2 and 3, however, disclose a circuit for supplying hot water as well as chilled water to each of the air treating units 9, 10 and 12. To this end, each unit 5, 6 and 7 comprises a compressor P, an evaporator-water-chiller E, a condenser C and an expansion valve V. Each compressor P is connected to draw refrigerant vapor from the evaporator E and compress the vapor to a higher pressure and temperature and deliver it to the condenser C. The refrigerant vapor condenses the condenser C and the liquid refrigerant then flows from the condenser back to the evaporator-chiller in liquid phase as controlled by the valve V.

One or more of the stages 5, 6 and 7 has a condenser C which is divided into two sections C–1 and C–2 with each section having headers H–1 and H–2 with tubes T–1 and T–2, respectively. The line 25 from the condenser section C–1 of the third stage is connected to deliver water to the air treating units 9 and 10 and a line 25a parallel with line 25 is connected to deliver water to air treating units 12, respectively. Thermostatically operated valves 26, 27 and 28 are provided at the juncture of the chilled and hot water lines to the air treating units 9, 10 and 12, respectively, for controlling the flow of chilled water or hot water, or a mixture thereof to each of the air treating units. Each of the lines 25 and 25a may also include an auxiliary heater 29 and 29a, respectively, for supplying additional heat if the condensers of the units 5, 6 and 7 cannot supply all of the heat required for the peripheral units 12.

Condenser sections C–2 for the refrigeration units 5, 6 and 7 may be connected either in series or in parallel by a water circuit 30 including a cooling tower 31. The cooling tower circuit includes valves 30a for connecting the condensers C–2 in series when open and valves 30b for connecting the condensers in parallel when opened and valves 30a are closed. If all of the heat delivered to the condensers C of the refrigeration units 5, 6 and 7 is not utilized for heating in various areas of the building, then the surplus heat is discharged to the atmosphere outside the building through the cooling tower 31.

In addition to the valve 20 as in FIGURE 1, the circuit illustrated in FIGURES 2 and 3 has an additional valve 20a with passages 21a and 22a. When the circuit is operating for summer conditions, as illustrated in FIGURE 2, the valves 20 and 20a are adjusted so that chilled water at 45° F. is supplied through valve 27 and passage 22 of valve 20 to the outside air unit 10, and water from recirculating air unit 9 is returned through line 14, passage 21 of valve 20, line 14a and passage 21a of valve 20a back to pump 16. When the circuit is operating for winter conditions, as illustrated in FIGURE 3, the valves 20 and 20a are adjusted so that water from unit 9 flows through line 14 and passage 21 of valve 20 to the unit 10 for handling outside air to heat the air. Such heating may be supplemented as required by hot or cold water from line 25 which flows through the valve 27, passage 22 of valve 20, line 14a and passage 22a of valve 20a to the outside air unit 10. Valves 20 and 20a may be operated manually or thermostatically in accordance with an outside temperature. Valve 27 for supplying additional heat, as required, is operated thermostatically responsive to the temperature of the air leaving the unit 10 for conditioning outside air.

The control of the units 9, 10 and 12 may be accomplished by throttling the quantity of water supplied to the units but, preferably, a constant volume of water is supplied by pump 16 and this water is delivered through the air treating units 9, 10 and 12 at a constant rate, but its temperature is modified for producing required conditions by adjusting valves 26, 27 and 29 to mix hot and cold water. However, when the water from unit 9 also passes through unit 10 the rate of flow through the units is not uniform unless the units have the same capacity. Usually the unit 10 for treating outside air has a larger capacity than the unit 9 so that on heating additional water is supplied through the hot or cold water line to produce the required air outlet temperature. When the unit 10 has a lower capacity than unit 9 then some of the water must bypass unit 10. A valve 17a and bypass line 18a are provided for this purpose to deliver all water in addition to that required by unit 10 back to pump 16. When the valve 28 controlling the supply of hot water to the window units 12 is wide open, on heating, then the operation of the heater 29a would be controlled by the outside temperature to increase the temperature of the water to balance the transmission loss of heat through the walls and roof of the building. In these ways the heating and cooling requirements can be satisfied depending upon the individual requirements of a particular installation.

With the valves 20 and 20a adjusted to the position shown in FIGURE 2 for summer operation, water from the third refrigerant stage 7 at 45° F. is delivered to the air treating unit 9. During its passage through the coils of the air treating unit 9 the water is heated and leaves the unit 9 at a temperature of, for example, 65° F. and returns through the port 21 of the valve 20, line 14a and port 21a of valve 20α back to the pump 16. Another portion of the chilled water in line 8 is delivered through the thermostatic valve 27 in line 8a to the air treating unit 10 to cool the outside air from a temperature of, for example, 95 F. to 56° F. The water then returns from the air treating unit 10 through line 13 to the first refrigeration stage 5.

The chilled water from between stages 6 and 7 is delivered through the thermostatic valve 28 to the peripheral air treating units 12 usually located under the windows and is returned through return lines 15 and 14a to the pump 16. All of the heat absorbed in the air treating units 9, 10 and 12 is converted by the compressor P of the refrigeration units 5, 6 and 7 from low temperature to a high temperature heat after which the compressed refrigerant is delivered to the condensers C of its unit. The heat is then transferred to the water in the cooling tower circuit 30 and is dissipated to the atmosphere at the cooling tower 31.

During all seasons of the year hot water is available in the hot water lines 25 and 25a for the air treating units 9, 10 and 12 to heat the air as required, and any surplus heat not used for heating is dissipated to the atmosphere through the cooling tower 31. At some outside temperature between 35° F. and 75° F. the valves 20 and 20a are turned from the position shown in FIGURE 2 to that shown in FIGURE 3. Water leaving the air treating unit 9 after cooling the interior or core of the building is then delivered through the port 21 of the valve 20 directly to the unit 10 for treating outside air being delivered to the building. At, for example, an outside air temperature of 35° F., water is supplied to the air treating unit 9 at 45° F. and leaves the unit at 65° F. This water at 65° F. enters the air treating unit 10 in counter-current flow relation with air entering the building to heat the air from 35° F. to 56° F. The water leaves the air treating unit 10 at a temperature of 45 to 55° F. This water may then flow through the circuit including the refrigeration units 5, 6 and 7 without requiring any additional refrigeration to perform the plural functions of both cooling the air at the interior of the building and heating the outside air delivered to the building. At outside temperatures between 35° F. and 75° F. the temperature of water supplied to unit 10 from unit 9 may be modified by supplying hot or cold water, as required, through thermostatic valve 27, passage 22 of valve 20, line 14a and passage 22a of valve 20a to produce the cooling required to deliver air to the space at 56° F. At outside temperatures below 35° F. additional hot water is supplied through the same path to the water entering the air treating unit 10 to heat the entering air to the required temperature. The wide range coils used in unit 10 for heating air from 35° F. to 56° F. also operates advantageously to cool the water from, for example 65° F. to 45° F.

A circuit of modified construction is illustrated in FIGURE 4 which is particularly adapted for use in especially cold climates where the temperature of water returning from the window units 12 may become extremely high. The circuit illustrated in FIGURE 4 is the same as the one shown in FIGURES 2 and 3 except for the path of flow for the return water from the window units 12 and the use of two pumps. The line 15a from the window units 12 is directed to a pump 32 in a loop circuit 44 separate from the circuit including pump 16. The loop circuit 44 includes a separate heater 29a and is connected to the valve 28 for the air treating units 12. Equalizing lines 45 and 45a connect pumps 16 and 32 in parallel at the inlet and outlet thereof and line 25 passes through the sections C–1 of condensers C and includes a valve 45V. Line 44 also contains a valve 44V and is connected to heater 29a.

The circuit illustrated in FIGURE 4 operates in the same way as the circuit illustrated in FIGURES 2 and 3 except that water at high temperature returning from the window units 12 may be directed from pump 32 through loop circuit 44 when valve 44V is open and valve 45V is closed. On the other hand, return water from window units 12 may be directed by both pumps 16 and 32 through line 25 by opening valve 45V and closing 44V. Condenser C–1 of units 6 and 7 also may be by-passed by opening valves 44V and closing valve 45V.

The chart in FIGURE 5, referred to above, illustrates the heating and cooling requirements of a particular building having a break-even point of 35° F. In other words, the amount of heat normally occurring in the building at 35° F. just balances the heat losses from the building. Below 35° F. heat must be supplied to the building and above 35° F. heat must be removed from the building. The horizontal lines parallel to the line through the 35° point indicate B.t.u.'s in millions of units. The vertical distance between the diagonal line and the horizontal line through the break-even point at 35° F. which it intersects shows the amount of heat that must be removed or added at any particular outside temperature condition.

Figure 6:
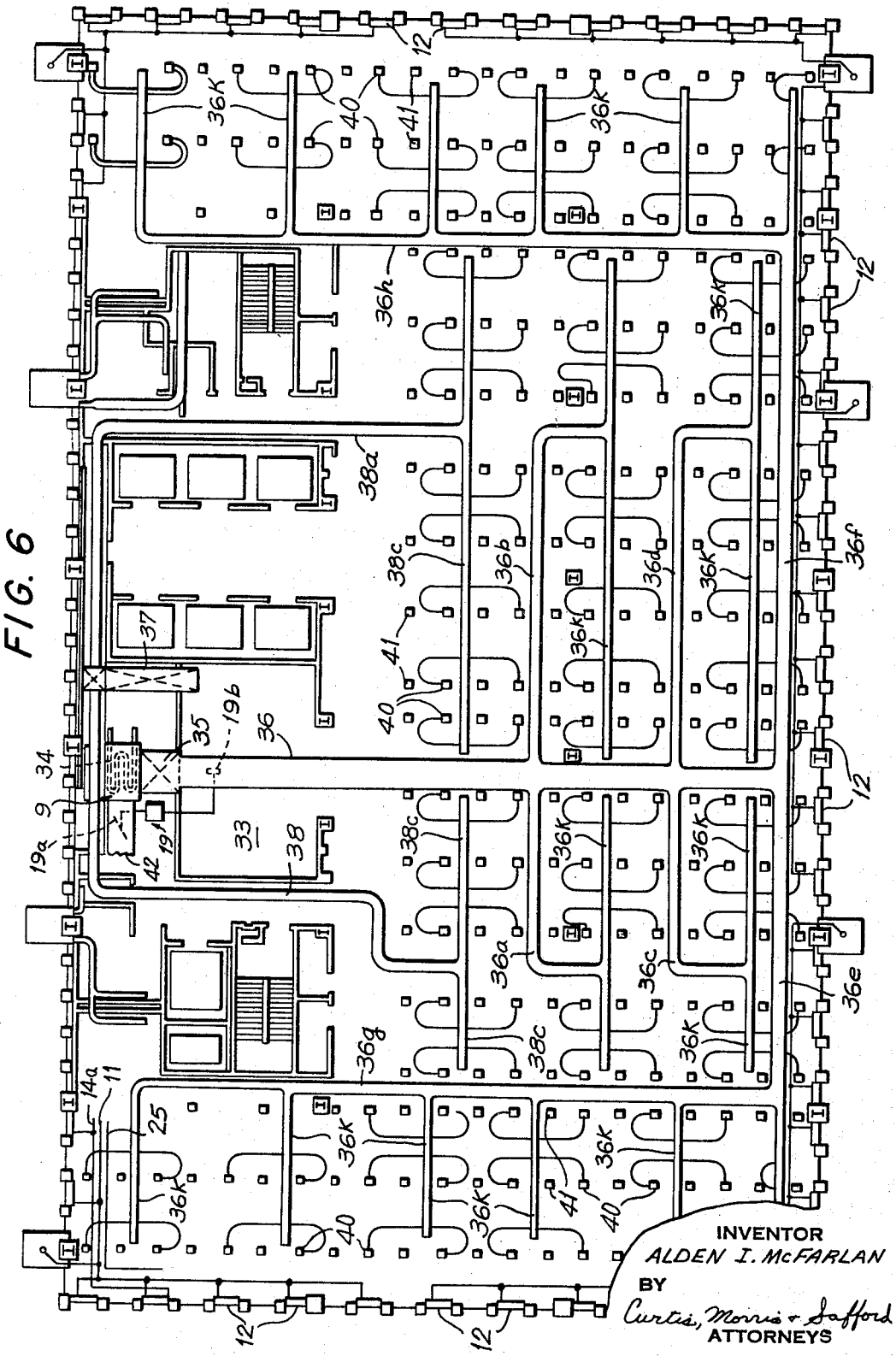
FIGURE 6 is a plan view of one floor of a typical modern building showing an air distributing arrangement in which the space to be condition is used as a plenum for mixing conditioned outside and return air supplied thereto in separate streams.

FIGURE 6 illustrates an air distributing system in a modern building in which outside fresh air and recirculated air are delivered in separate streams to the space to be conditioned and mixed therein. The same end result can be accomplished by mixing the conditioned outside air stream and the conditioned recirculated air into one duct for distribution. The air treating unit 9 for cooling recirculated air is shown in a utility room 33 on a particular floor of a building and comprises a casing enclosing a heat transfer coil 34 and fan 35 for delivering conditioned air through a duct system including the main duct 36. The main duct 36 has lateral branches 36a to 36d and branches 36e and 36f have branches 36g and 36h at their ends parallel with the main duct 36. All of these branches 36a to 36h have lateral extensions 36k which overlie different areas at the east, south and west sides of the building.

An air duct 37 from a fresh air treating unit 10, see FIGURE 7, extends vertically through a number of floors of a building. Extending laterally and forwardly from the vertical duct 37 are distributing ducts 38 and 38a with distributing branches 38c overlying center or core areas of the building between the extensions 36a to 36h at the east, south and west sides.

Air treating units 12 are shown along the peripheral walls of the building and located under windows. A chilled water line 11 is shown connected to the peripheral units 12, but it will be understood that when a three pipe distributing system is used a hot water line 25 and common return line 14a are provided as shown diagrammatically in the upper left hand corner of FIGURE 6, only.

Air outlets 40 are arranged alternately with air exhaust grills 41 over the entire area of the space to be conditioned. Preferably, the air outlets 40 are located in a false ceiling and are connected to the extensions 36k and 38c of the separate air distributing ducts 36 and 38 for recirculated and fresh air, respectively. Exhaust grilles 41 are connected to a similar system of conduits or may return above the false ceiling to the air return duct 42 to the unit 9. The ducts to which the air outlets 40 are connected also are located between the false ceiling and bottom of each floor. With the arrangement of distributing ducts 36 and 38 as illustrated in FIGURE 6 none of the ducts cross each other and supply fresh air and recirculated air to the space where they may mix with each other. It will be understood that conventional air exhausts are provided, when necessary, to provide for the relief of air from the building beyond that required to keep the building under reasonable positive pressure. It will further be understood that the outside air leaving the unit 10 will have been cooled sufficiently below the room dew point to provide the relative humidity desired. As the heat transmitted through the walls of the building is completely balanced by the peripheral units 12, the entire load at the interior of the building is a cooling load which is balanced by the air supplied through ducts 36 and 38. When the cooling load in the core of the building is substantially constant the air may be supplied thereto at a substantially constant rate and air supplied to the peripheral areas may be varied to compensate for variations such as the number of people, sun load, etc. Preferably, however, the load is balanced in rooms or zones by varying the quantity of air supplied to each room or zone throughout the space being conditioned. A static pressure regulator 19 is provided in the inlet or outlet from the air treating unit 9 having a damper 19a and sensing element 19b for maintaining a substantially constant pressure in duct 36.

FIGURE 7 illustrates the building diagrammatically in elevation and shows the unit 10 for treating outside air as located on the roof of the building and the different air distributing systems used on the different floors of the building. The outside air treating unit 10 is shown diagrammatically as comprising a filter 46, and heat transfer coil 48. A fan 49 draws outside air through the filter 46, and coil 48, successively, and then delivers it to the vertical conduit 37 as shown in FIGURE 6. This unit 10 is adjusted in summer to cool the air down to a predetermined dew point temperature corresponding to the relative humidity desired at the inside temperature to be maintained. When the temperature of the outside air is below the wet bulb temperature required to give the desired relative humidity, then the air need only be heated to maintain comfort conditions with the possible addition of moisture if desired. This outside fresh air is then taken from the vertical duct 37, see FIGURE 6 and delivered to the respective floors as required. For example, on the sixteenth floor, illustrated in FIGURE 6, predetermined amounts of conditioned fresh air and return air are delivered from the vertical duct 37 and return air unit 9 in order to satisfy the ventilation and temperature requirements. The fifth floor is like that illustrated in FIGURE 5 where both fresh air and return air are distributed in branch conduits. On the fourth floor, on the other hand, at least twice as much outside fresh air is used as return air because of special ventilating requirement. In the Conference Room 75% outside air is used. In the Cafeteria, 100% outside air is used, but in the Cafeteria additional cooling is required so that the air quantity is determined by the load and it is desirable to not recirculate and exhaust through the kitchen. It will also be observed from FIGURE 7 that in the basements 95% return air only is used for non-critical storage areas and outside air is supplied through vertical ducts from the basement as well as from the roof.

FIGURE 8 illustrates a higher pressure air treating unit 9 similar to that shown in FIGURE 6 for supplying primary air to the peripheral units 12 when induction, reheat or any other type unit is used requiring primary air. This unit comprises a filter 50, and heat transfer coil 51 and blower 52 generally similar to the elements in the unit 10. The primary air may be outside air, recirculated air or a mixture of both and is delivered to the peripheral The peripheral air treating units 12 may be of any suitable type, as stated above, such as air induction units of the kind shown in FIGURE 9 or fan coil units as shown in FIGURE 10. The air induction unit illustrated in FIGURE 9 comprises a rectangular vessel 53 to which conditioned air from an air treating unit flows through duct 54, see FIGURES 8 and 9. The vessel 53 has a series of restrictive outlet openings 55 in the form of nozzles to issue jets of the conditioned air vertically and located at the room side of the vessel 53 above the outlet openings 55 is a heat transfer coil 56 through which chilled or hot water flows. The vertical jets of conditioned air induce flow of room air across the heat transfer coil 56 which mixes with the air from the jets and then flows from the unit through a grill 57 at the top thereof. Thus, the chilled or hot water in the line 11, as shown in FIGURES 2 and 3, is delivered to the heat transfer coil 56 and is returned through the line 15.

A peripheral fan coil type unit is shown in FIGURE 10 as comprising a casing 58 having an air inlet 59 at the bottom and an air outlet 60 at the top. A transverse partition 61 divides the casing and mounts a fan 62 on the lower side and a heat transfer coil 63 on the top. Thus, the fan 62 draws room air into the casing 58 through the air inlet opening 59 and delivers it through the partition 61 and finned coil 63 and then out through the air outlet grill 60. The finned coil 63 is like the coil 56 in the air induction unit of FIGURE 9 in that it receives hot or cold water from the liquid distributing systems illustrated in FIGURES 2 and 3 to either heat or cool the air as required.

The air outlets 40 may be of any suitable construction for varying the volume of air supplied in accordance with the temperature in the area to be air conditioned. Such air outlets are illustrated diagrammatically in FIGURES 11 to 14. One form of air outlet 65 for a ceiling is illustrated in FIGURE 11 as comprises a diffuser having a series of outwardly curved rings 66 supported from a frame 67. A thermostatically operated motor 68 is mounted on said frame 67 and connected through an actuating rod 69 to a lifting cone 70. When released the rings hang down in open spaced relation to deliver a maximum volume of air. As the motor 68 actuates the rod 67 and lifting cone 70 upwardly, it telescopes the rings into a more closely adjacent nested relationship to decrease the volume of air flowing therethrough and the volume varies directly with the raised position of the lifting cone 70.

Figure 12:
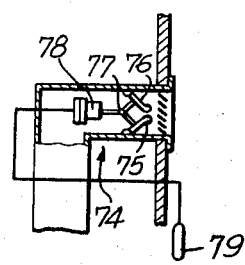
FIGURE 12 is an elevational view partly in section of a wall outlet for varying the volume of air delivered to the space.

Another form of variable volume wall outlet 74 is shown in FIGURE 12 as comprising pivoted vanes 75 and 76 connected through a linkage 77 to a motor 78 operable by a thermal-responsive element 79. Thus, when the temperature in an area of the space being controlled increases above a predetermined value of, for example, 75° F., the vanes 75 and 76 are moved away from each other to progressively increase the amount of air that can flow therethrough. Certain of the air outlets 40 or groups of outlets, as shown in FIGURE 6, would be controlled by the same thermal-responsive element 79 as the temperature conditions in the area controlled by the outlet or group of outlets varies.

Figure 13:
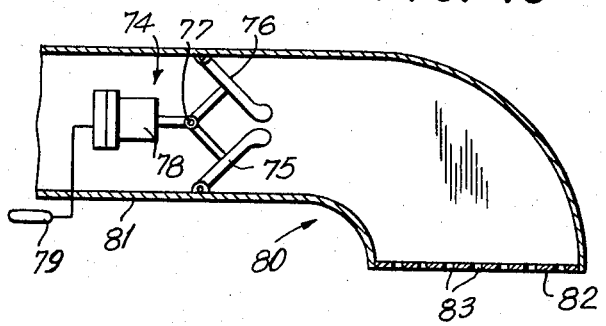
FIGURE 13 is a side view partly in section of a ceiling outlet of still further modified construction in which dampers in the duct control the flow therefrom.
Figure 14:
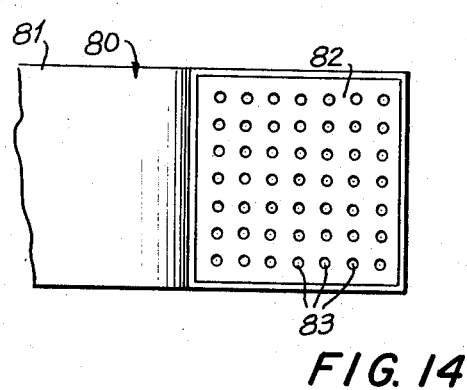
FIGURE 14 is a bottom plan view of the outlet illustrated in FIGURE 13 and showing the perforated plate construction.

Still another form of air outlet 80 for use in a ceiling is shown in FIGURES 13 and 14. This type of air outlet 80 is generally similar to the construction illustrated in FIGURE 12 except that it is positioned in a conduit 81 having a right angular turn at its end with a perforated plate 82 therein. Plate 82 is usually of a size to replace a conventional ceiling tile and having its perforations 83 simulating the perforations in such tile. A thermostatic element 78 responsive to the temperature in the space is connected to the motor 78.

Figure 15:
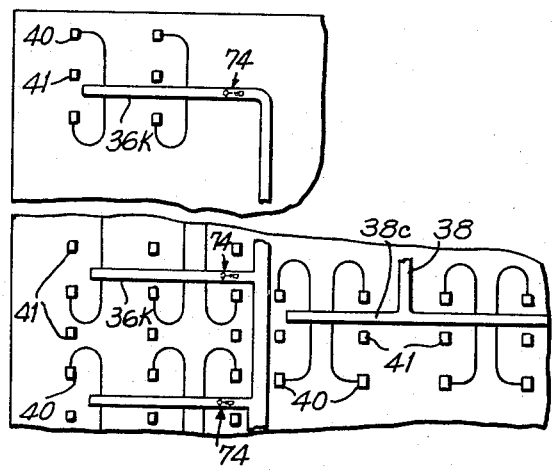
FIGURE 15 is a plan view of one corner of a floor illustrated in FIGURE 6 to show a group of outlets controlled by a single volume control device.

FIGURE 15 illustrates a section of the periphery and core space of a building to show how a group of outlets 40 may be controlled by a single volume control device as well as a single unit. FIGURE 15 also shows how the air distribution system may be arranged to deliver air to the inner core space without control to take care of a constant load produced in that zone, but control the volume of air supplied to the peripheral space to take care of cooling load variations resulting from sun effects and other factors.

The peripheral air conditioning units 12 are sized to take care of the load resulting from heat transmission through the walls of the building only. In other words, the units 12 need only have a capacity to absorb the heat flowing through the walls into the building at an outside temperature of 95° F., or supply the heat necessary to compensate for the flow of heat from the building when the outside temperature is, for example, 0° F. As the rate of heat transmission through the walls of the building is directly proportional to the difference in temperature inside and outside the building, the peripheral air treating units 12 may be automatically controlled by a single thermostat responsive to the outside temperature. Such a thermostatic element is indicated by the reference character 90 in FIGURES 2 and 3 for controlling valve 28, but it will be understood that one thermostat would be used to control all of the units 12 in the building and the temperature of the water supplied to the units when heating. The entire remainder of the heat load including heat generated in the building and heat resulting from sun radiation is then carried by the air treating units 9 and 10. Variations in this remaining heat load are controlled by the thermostatically operated outlets 40 of the air duct distributing systems 36 and 38 for the units 9 and 10, see FIGURE 6, which vary the volume of treated air delivered to any particular area in accordance with the temperature therein. Thus, a close control may be obtained for each area of the space in accordance with requirements depending from the number of people or appliances which are generating heat at the center of the building, or depending upon whether the sun is shining and the side of the building on which it shines. Also, controls may be set by occupants to maintain a desired temperature in a particular zone independently of other zones. Finally the separate air ducts systems supply outside air and return air to the space being conditioned in separate streams where it mixes before being returned for further conditioning. The air distribution system and elements illustrated in FIGURES 6 to 15 also utilize heat absorbed in the core of the building by the water distributing systems of FIGURES 1 to 4 for either heating peripheral areas of the building where heating is required, or for heating outside air as it enters the building. The distributing system also permits the use of outside fresh air to cool the interior of the space being conditioned in separate air treating units and thereby using the space itself or the supply duct as a mixing chamber. A reduction in the size of the fans and ducts may be obtained over that required when the two streams are mixed before contacting the heat transfer coil.

Figure 16:
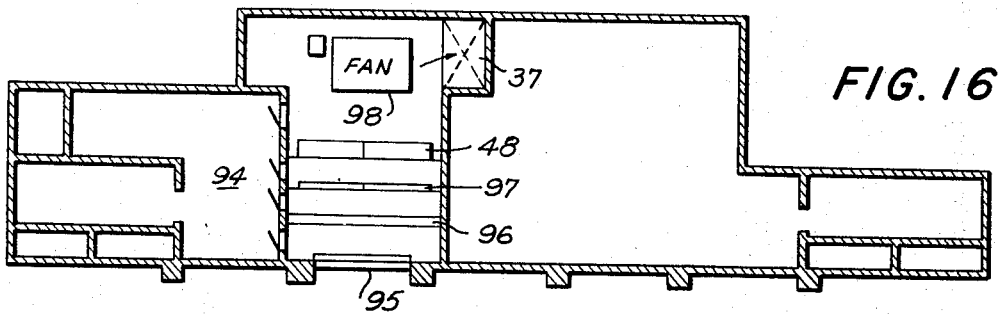
FIGURE 16 is a plan view of a central unit of modified construction for treating outside air and having a separate coil for initial contact by outside air for tempering the air.

FIGURE 16 shows an air treating unit 94 for outside air having a preheating element to initially heat the outside air entering the building to a temperature at which the heat generated in the building equals the heating load. Air treating unit 94 is generally similar to the unit 10 illustrated in FIGURE 7. Outside air is delivered through louvers 95, and then flows through filter 96, a separate glycol coil 97 and the regular coil 48 of the outside air treating unit 10. The outside air is delivered by a fan 98 into the vertical duct 37, see FIGURE 6. This system is particularly desirable at geographical locations where extremely low temperatures prevail which might create a freezing problem.

It will now be observed that the present invention provides an improved method of and system for air conditioning buildings in which the peripheral air treating units all operate simultaneously on heating or cooling to balance only the heat transmitted through the walls of the building. It will also be observed that the volume of air supplied to the space is varied in accordance with the inside temperature to take care of the entire remainder of the heating or cooling load in the building. It will further be observed that the present invention utilizes heat occurring at the interior of the building to heat the peripheral air space and outside air entering the building and delivers both conditioned outside air and recirculated air to the space in separate streams to cool the space. It will still further be observed that the present invention provides an improved system for air conditioning a building which is of simple and compact construction, one which reduces the size of the refrigeration and air treating units, the space required for ducts, conduits and auxiliary equipment as well as providing for a lower cost of installation and operation than conventional air conditioning systems.

While a preferred method and several forms of the apparatus are illustrated and described, it will be understood that changes may be made in the steps of the method and in the form and construction of the apparatus without departing from the spirit or scope of the invention. For example, the invention is shown applied to a three pipe system, but it will be understood that it can be used in a four pipe system having separate heating and cooling circuits through the condenser and evaporator of a refrigeration unit, or in a dual duct system for supplying hot or cold air or a mixture thereof to a space being conditioned, or a reheat system in which primary air supplied to the peripheral area is heated to produce the required temperature. The improvement can also be used with conventional coils, but preferably is used with wide range coils to obtain a maximum temperature difference between air and water leaving the coil. The term "wall" is intended to include windows, glass, the roof on the top floor as well as any portions of a roof on set-backs through which heat is transferred from the exterior to the interior of the building and which must be balanced by the peripheral air treating units. The term "water" as used in the specification and claims is intended to be synonymous with antifreeze heat transfer mediums such as glycol solution. Therefore without limitation in this respect the invention is defined in the following claims.

I claim:

1. A method of air conditioning a building comprising, the steps of, supplying a conditioned fluid to the periphery of each floor of the building at temperatures above the temperature to be maintained on said floor when heating is required and below said temperature when cooling is required to balance only the heat transmitted by conduction through the peripheral walls of the building, supplying conditioned air to each space in the building to be conditioned at a temperature below the temperature in said space to balance the remaining load in the space, and controlling the volume of the conditioned air supplied to each space in accordance with changes in the load within the individual space.

2. A method of air conditioning a building comprising, the steps of, supplying a heat exchange medium to the periphery of each floor space of the building at temperatures above the temperature to be maintained on said floor when heating is required and below said temperature when cooling is required to balance the heat transmitted through the walls by conduction, supplying air to the interior of each floor space at a temperature to produce the required relative humidity for comfort conditions and below the temperature in said space, varying the temperature of the heat exchange medium supplied to the periphery of each floor space in accordance with changes in the temperature of the ambient air at the exterior of said building, and controlling the amount of air supplied to each floor space in accordance with the temperature in said space to maintain the required temperature in said space.

3. A method of air conditioning a building having an internal core space requiring cooling the year around and a peripheral space requiring heating and cooling at different periods of the year depending upon whether heat transmitted through the walls flows to or from the exterior of the building comprising the steps of, supplying air at the peripheral space of the building at a temperature and rate to balance the heat transmission through the walls of the building, supplying air to the interior core space of the building at a temperature below the temperature to be maintained in said space and at a rate to balance the remaining heat load occurring in said space, varying the temperature of the air supplied to the periphery of the floor space inversely proportional to changes in the temperature of the ambient air at the exterior of the building, varying the volume of air supplied to the interior of the floor space in accordance with the temperature in said space to maintain a desired temperature throughout the space, and transferring heat removed from the interior of the floor space to the air supplied to the periphery of the floor space when heating is required.

4. A method of air conditioning a building comprising the steps of, supplying air to the periphery of said building, varying the temperature of said air at the periphery of said building inversely proportional to the ambient temperature outside said building to balance only the heat transmitted through the walls of the building by the temperature differential between the temperature of the ambient air and temperature maintained at the periphery, recirculating and cooling the air in said building and delivering said conditioned air in one stream to each a plurality of separate spaces to be conditioned at the interior of said building, delivering outside air to each of a plurality of spaces at the interior of said building in a stream separate from the stream of recirculated air in said space for mixture therewith, said recirculated and outside fresh air cooling said interior space, and varying the volume of said air delivered to each interior space from the separate streams in accordance with the temperature of each space to compensate for sun effect and heat generated in said space.

5. A method of air conditioning a building in accordance with claim 1 in which the conditioned fluid supplied to the periphery of the building is a liquid, the temperature of the air at the periphery being varied by heat exchange with said liquid, and varying the temperature of the liquid supplied to the periphery of the building in accordance with the ambient temperature at the outside of the building.

6. A method of air conditioning a building in accordance with claim 1 in which the conditioned air supplied to each space is cooled by heat exchange with chilled liquid to produce a predetermined relative humidity and temperature, and varying the amount of cooled air supplied to each space in accordance with the temperature therein.

7. A method of air conditioning a building in accordance with claim 1 which includes the steps of, cooling the air supplied to the interior of the building by heat exchange with a chilled liquid to produce a required relative humidity and temperature, varying the temperature of the air at the periphery of the building in accordance with the temperature of the outside ambient air by heat exchange with a liquid, and using the liquid to transfer heat absorbed at the interior of the floor space to the air at the periphery of the building when heating is required.

8. A method of air conditioning a building in accordance with claim 1 which includes the steps of supplying outside air directly to the interior of each space when the temperature of the ambient air outside the building is at a temperature to cool said space, and transferring the heat produced in said interior space to heat the outside air supplied to said space when heating is required.

9. A method of air conditioning a building in accordance with claim 1 in which the temperature of the air at the periphery of the space is varied inversely to the temperature of the ambient air outside the building to cool the peripheral space when cooling is required and heat the peripheral space when heating is required, and shifting from cooling to heating in response to changes in the temperature of the outside ambient.

10. A method of air conditioning a building in accordance with claim 1 which includes the steps of varying the temperature of air entering a space by heat exchange with a fluid medium to provide a source of primary air for delivery to the periphery of each space, directing said primary air to recirculate secondary air at the periphery of said building, varying the temperature of said recirculated air by heat exchange with fluid medium, maintaining a predetermined difference in temperature between said last named fluid medium and the temperature of the air in said space, and varying the temperature of at least one of said primary air and heat exchange fluid mediums in accordance with variations in the outside ambient air temperature.

11. A method of air conditioning a building in accordance with claim 1 which includes the steps of supplying outside air to the interior of the space when the outside temperature is below that in said space, and increasing the quantity of said outside air supplied to said space as the temperature increases to maintain a predetermined temperature therein.

12. A method of air conditioning a building having a cooling load at the interior and a heating load at the periphery which includes the steps of recirculating air in a space to be cooled, supplying outside air to cool said interior space, and passing a heat exchange fluid through a circuit, first in heat exchange with the recirculated air to cool the air and heat the fluid and then in heat exchange with the outside air entering the building to heat the outside air and cool the fluid before it again passes in heat exchange with the recirculated air.

13. A method of air conditioning in accordance with claim 12 in which the heat exchange fluid is a liquid and is directed in separate paths through the evaporator and condenser of a refrigeration system to cool a portion of the fluid and heat another portion of the heat exchange fluid whereby heat absorbed in the interior of the building is transferred to the periphery of the building by the heat exchange liquid when heating is required.

14. A method of air conditioning a building in accordance with claim 12 in which a second heat exchange fluid is passed in heat exchange without outside air entering the building to heat it to a temperature at which the heat occurring in the building equals the heat losses from the building when heating is required.

15. An air conditioning system for a building having interior space and peripheral space comprising a plurality of air treating units spaced from each other in the peripheral space for delivering air thereto, separate conduits for supplying recirculated and outside fresh air to separate areas of the interior space, a central air treating unit in the conduit for supplying recirculated air to the interior at a predetermined temperature and relative humidity, said interior constituting a chamber for mixing the recirculated and outside air supplied to the separate areas of said interior to cool said space, control means including a thermostat responsive to the temperature of the air outside the building and connected to control the peripheral units to inversely vary the temperature of the air delivered from all of said units in accordance with the outside ambient temperature to substantially balance only the heat transmitted through the walls of the building by conduction at the temperature differential between the outside air temperature and temperature maintained at the peripheral space, and control means responsive to the temperature in the separate areas of said interior space and connected to vary the amount of air supplied to said areas from said separate conduits in accordance with variations in the internal load.

16. An air conditioning system for a building in accordance with claim 15 in which the air treating units at spaced locations around the periphery of the building are fan coil units having a fan for circulating air in the peripheral space over a coil in the unit, a liquid circuit connected to the coils in said units, and the control means to vary the temperature of the air delivered from the peripheral units comprises means to heat the liquid in said circuit.

17. An air conditioning system for a building in accordance with claim 15 in which the air treating units at spaced locations around the periphery of the building are air induction units comprising means for delivering primary air to each unit under pressure, means for conditioning the primary air, and nozzles through which the primary air flows for inducing flow of secondary air from the peripheral space over the coil in said unit.

18. An air conditioning system for a building in accordance with claim 15 in which one air treating unit is provided for treating air recirculated in said space, another air treating unit is provided for treating outside air supplied to said space, the liquid circuit having a coil in each of said air treating units and separate branches for the separate coils, and valve means for selectively connecting said air treating units in parallel and in series, respectively, in said circuit.

19. An air conditioning system for a building in accordance with claim 18 in which the separate air treating units have separate air distributing system for delivering air to different areas of said space in separate streams for mixture in said space, variable volume outlets from the distributing systems and a thermostat responsive to the temperature in an area for controlling said outlets.

20. An air conditioning system for a building in accordance with claim 18 in which the water circuit has a cooling branch and a heating branch, a refrigeration unit having an evaporator-chiller in the cooling branch and a condenser in the heating branch, lines for delivering liquid from each of the air treating units for delivery through the heating and cooling branches as required, each branch being connected to deliver liquid to each air treating unit, and a valve for controlling the flow of chilled and heated liquid through each unit.

21. An air conditioning system for a building having an interior space comprising separate conduits for supplying recirculated air and outside air to said interior space, an air treating unit in the conduit for supplying recirculated air to said space, another air treating unit in the conduit for supplying outside air to said space, a circuit connecting said air treating units for circulating a heat transfer liquid therethrough, and valve means for selectively connecting said air treating units in parallel and in series, respectively, in said circuit whereby to cool the air in both of said conduits or cool recirculated air and heat outside air with heat removed from the recirculated air.

References Cited

UNITED STATES PATENTS

| | | | |
|---|---|---|---|
| 2,797,068 | 6/1957 | McFarlan | 165—63 X |
| 2,984,458 | 5/1961 | McFarlan | 165—22 |
| 3,067,587 | 12/1961 | McFarlan | 165—22 X |
| 3,165,148 | 1/1965 | Soule | 165—29 |
| 3,179,162 | 4/1965 | McFarlan | 165—22 X |

FOREIGN PATENTS

| | | |
|---|---|---|
| 636,723 | 2/1962 | Canada. |
| 897,266 | 5/1962 | Great Britain. |

ROBERT A. O'LEARY, *Primary Examiner.*

A. W. DAVIS, *Assistant Examiner.*